United States Patent [19]

Percy, Jr.

[11] Patent Number: 5,439,076
[45] Date of Patent: Aug. 8, 1995

[54] EMERGENCY BRAKE DEVICE FOR TRUCKS AND THE LIKE

[75] Inventor: George A. Percy, Jr., Bel Air, Md.

[73] Assignee: P.C.T. Inc., Joppa, Md.

[21] Appl. No.: 229,897

[22] Filed: Apr. 19, 1994

[51] Int. Cl.⁶ ............................................. B60T 1/00
[52] U.S. Cl. ........................................ 188/4 R; 188/5
[58] Field of Search ................ 188/4 R, 4 B, 5, 8, 188/21, 23, 32, 45, 36

[56] References Cited

U.S. PATENT DOCUMENTS

| | | | |
|---|---|---|---|
| 963,361 | 7/1910 | Dietz | 188/4 R |
| 1,384,589 | 7/1921 | Blaney | 188/4 R |
| 1,392,987 | 10/1921 | Unruh | 188/4 R |
| 1,401,350 | 12/1921 | Monahan . | |
| 1,427,916 | 9/1922 | Sheinker . | |
| 1,498,815 | 6/1924 | Sidelinger . | |
| 1,746,415 | 2/1930 | Burkart . | |
| 1,801,809 | 4/1931 | Fyfe . | |
| 2,344,148 | 3/1944 | Jackson | 188/4 R |
| 2,605,860 | 8/1952 | Smith | 188/4 R |
| 2,708,009 | 8/1952 | Allison . | |
| 2,730,196 | 1/1956 | Besoyan | 188/4 R |
| 2,732,035 | 1/1956 | Besoyan | 188/4 R |
| 2,746,570 | 5/1956 | Stahmer | 188/4 R |
| 2,868,333 | 1/1959 | Willison | 188/4 R |
| 2,960,191 | 11/1960 | Roberts . | |
| 3,042,151 | 7/1962 | Walker | 188/4 R |
| 3,078,963 | 2/1963 | Shea | 188/4 R |
| 3,086,619 | 4/1963 | Grotz | 188/4 R |
| 3,522,104 | 9/1950 | Edwards | 188/4 R |
| 3,605,954 | 9/1971 | Wakabayashi et al. | 188/4 R |
| 3,625,313 | 12/1971 | Lowrie | 188/4 R |
| 3,722,630 | 3/1973 | Wakabayashi | 188/4 R |
| 3,722,631 | 3/1973 | Lowrie | 188/4 R |
| 3,734,241 | 5/1973 | Hale | 188/32 |
| 3,902,574 | 9/1975 | Wright | 188/4 R |
| 4,265,448 | 5/1981 | Shea et al. | 188/4 R |
| 4,325,465 | 4/1982 | Lemon | 188/4 R |
| 4,386,681 | 6/1983 | Skelton | 188/4 R |
| 4,825,978 | 5/1989 | Verano | 188/4 R |

FOREIGN PATENT DOCUMENTS

| | | | |
|---|---|---|---|
| 276951 | 9/1965 | Australia . | |
| 272450 | 6/1966 | Australia . | |
| 773528 | 9/1934 | France . | |
| 1087996 | 9/1954 | France | 188/4 R |
| 1100900 | 3/1955 | France . | |
| 1120970 | 7/1956 | France . | |
| 1134246 | 11/1956 | France | 188/4 R |
| 565120 | 3/1958 | France . | |
| 2254460 | 7/1975 | France . | |
| 863754 | 1/1953 | Germany . | |
| 556295 | 2/1957 | Italy . | |
| 0099442 | 7/1980 | Japan | 188/4 R |
| 1364751 | 8/1974 | United Kingdom . | |
| 1676874 | 4/1991 | U.S.S.R. | 188/4 R |

*Primary Examiner*—Robert J. Oberleitner
*Assistant Examiner*—Peter M. Poon
*Attorney, Agent, or Firm*—Shlesinger Arkwright & Garvey

[57] ABSTRACT

An emergency brake device for stopping the rear wheels of a vehicle comprises a wedge assembly including a frame and a resilient wedge carried by the frame operably secured to the underside of the vehicle. The wedge assembly is movable from a stored position to an operative position such that the wedge is disposed between the rear wheel and the ground thereby to stop the vehicle. The wedge is substantially triangular formed by an inclined arcuate surface for engaging against the wheel and horizontal and vertical planar surfaces. The arcuate surface and the vertical planar surface terminate into a longitudinal projection portion at an upper end portion of the wedge adapted to engage the wheel when the wedge assembly is in the operative position. The wedge assembly has a flap secured to the wedge such that its trailing end portion extends beyond an end portion of the wedge and is adapted to be disposed underneath the wheel, thereby to pull the wedge horizontally, and its leading end portion is secured to the vertical planar surface of the wedge thereby to pull the wedge downwardly.

27 Claims, 7 Drawing Sheets

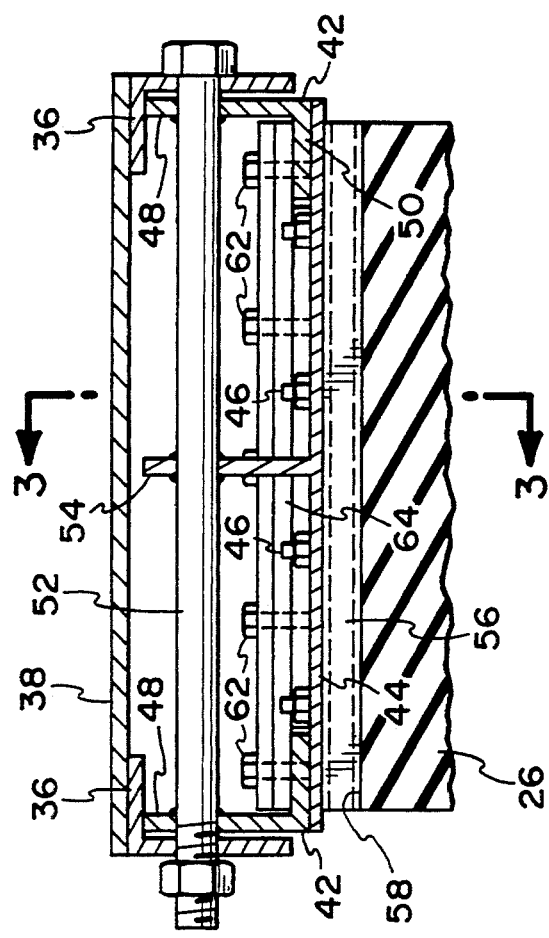
FIG. 3
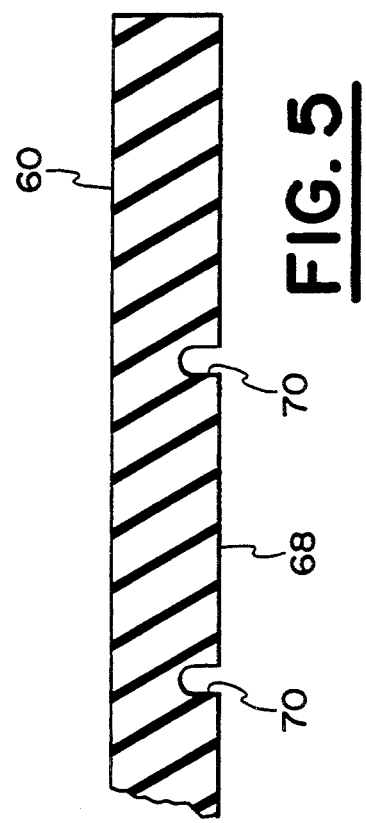
FIG. 4
FIG. 5

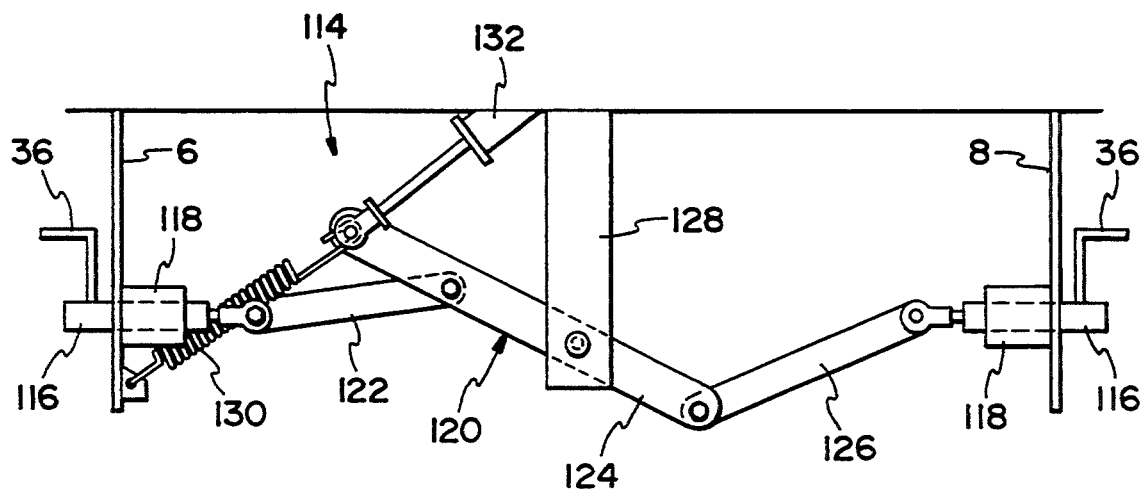
FIG. 9
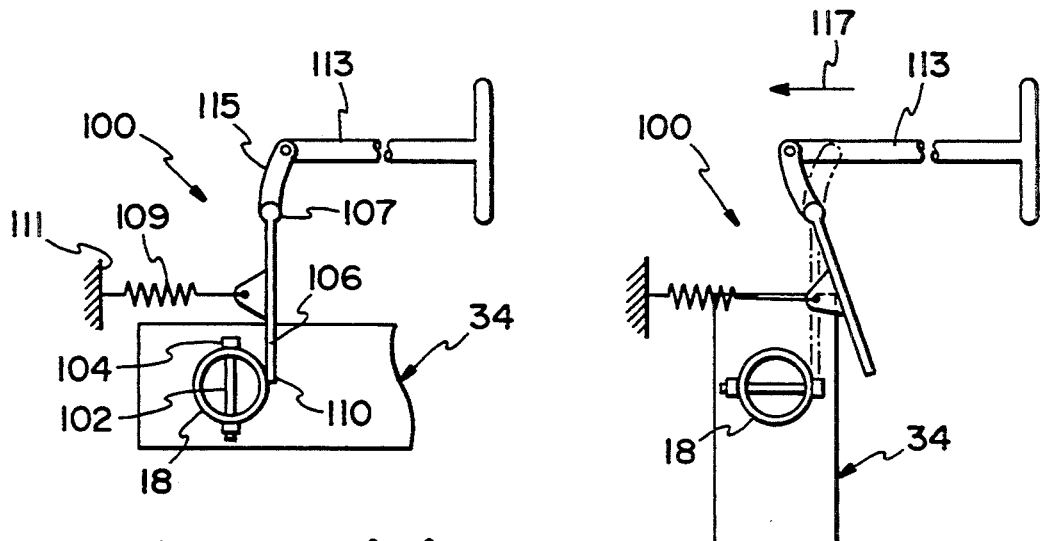
FIG. 8(a)
FIG. 8(b)

EMERGENCY BRAKE DEVICE FOR TRUCKS AND THE LIKE

FIELD OF THE INVENTION

The present invention relates to an emergency brake device for the stopping of heavy vehicles, such as trucks and trailers, in an extreme emergency requiring a panic stop or in the event of the failure of the regular braking system.

BACKGROUND OF THE INVENTION

For many years an effort has been made to provide an emergency brake device for trucks and trailers that is safe, effective and reliable. The situation has become more acute in recent years due to the overcrowding of the interstate highway system, particularly around urban areas. Due to higher speeds, higher gross weights and/or steep downhill grades, existing brake systems in trucks or other heavy vehicles are often inadequate to prevent them from causing accidents. Heavier loads are being allowed on interstate highways, contributing to the increased incidence of accidents involving trucks. One cause of brake failure is glazing. When a truck is negotiating downhill, the driver even if he downshifts before starting downhill must often use his brakes to further slow down the truck, for control around curves, etc. Often the heat build-up exceeds the capacity of present brake systems to dissipate the heat generated, resulting in a set of glazed brake pads and a runaway truck. Glaze renders the brakes totally useless. Another cause of brake failure is failure in the hydraulic or pneumatic system, causing loss of pressure necessary to activate the brake pads. In the event of brake failure, it is almost impossible to avoid an accident often accompanied by serious injuries or loss of life.

A fully loaded tractor-trailer under a panic stop situation often will experience jack-knifing. Under this situation, the trailer skids sideways at a faster rate than the tractor, overrunning the tractor and often causing the entire tractor-trailer to overturn. If the roadway is icy or snow-covered, the tendency of the tractor trailer to jack-knife is magnified many times over.

Prior art braking systems have not been as successful in addressing these problems. Braking systems which depend on activating the brake pads to stop a moving tractor-trailer or large commercial truck have not been satisfactory.

There is therefore a need to provide an emergency brake device for tractor trailers and the like that would stop the vehicle during a panic stop without jack-knifing even when the road is slippery.

OBJECTS AND SUMMARY OF THE INVENTION

It is an object of the present invention to provide an emergency brake device for large wheeled vehicles such as trucks, tractor-trailers and the like that is independent of the normal braking system that is normally stored in the vehicle in a standby position and which can be readily activated if its use is required in a panic stop or failure of the regular braking system.

It is another object of the present invention to provide an emergency brake device for large wheeled vehicles that is effective in shifting the weight of the vehicle to maximize the frictional forces to effectively stop the vehicle and adequately absorb the kinetic energy of the moving vehicle.

It is further another object of the present invention to provide an emergency brake device for heavy vehicles that provides very substantial and significant reduction in braking distances compared to normal braking distances for heavy trucks.

It is still another object of the present invention to provide an emergency brake device which, in its operating position, minimizes any stress on the vehicle or supporting structure except through the tire and axle assembly.

It is yet another object of the present invention to provide an emergency brake device that engages and locks the rear wheels of the vehicle at the same time thereby to maintain the direction of travel of the vehicle in a straight line.

It is an object of the present invention to provide an emergency brake device that deploys automatically upon loss of pneumatic or hydraulic pressure in the normal brake system of the vehicle.

It is another object of the present invention to provide an emergency brake device which in its operating position is able to stop the vehicle without jack-knifing.

It is yet another object of the present invention to provide an emergency brake device which can be used on vehicles with movable wheel assemblies.

These and other objects of the present invention will become apparent from the following detailed description.

BRIEF DESCRIPTION OF THE DRAWINGS

FIG. 3 is a cross-sectional view of one of the wedge assemblies used in the present invention, taken along line 3—3 of FIG. 4.

FIG. 4 is a fragmentary cross-sectional view taken along line 4—4 of FIG. 3.

FIG. 5 is a cross-sectional view of a flap taken along line 5—5 of FIG. 3.

FIGS. 8(a) and 8(b) are schematic cross-sectional views of a locking mechanism used in the present invention.

FIG. 9 is a front elevational view of an alternative embodiment of a latching mechanism used in the present invention.

DETAILED DESCRIPTION OF THE INVENTION

Figure 1:
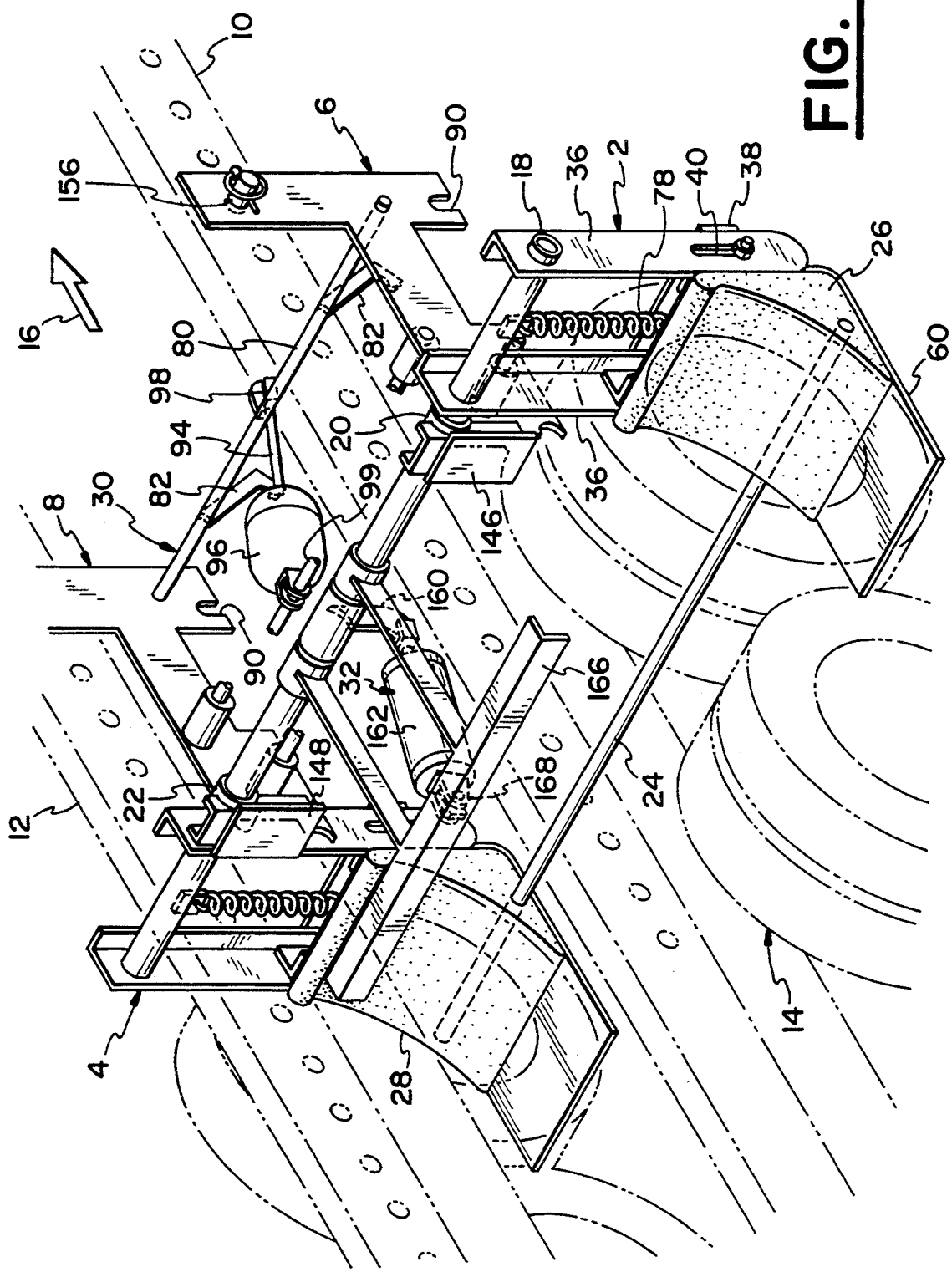
FIG. 1 is a perspective view of an emergency brake device in accordance with the present invention, shown in the deployed or braking position.

An emergency brake device R in accordance with the present invention is disclosed in FIG. 1. The device R comprises a pair of wedge assemblies 2 and 4 that are pivotally secured to a pair of frames 6 and 8, respectively, that are in turn secured to the respective rear wheel axle assembly (shown schematically in FIGS. 6 and 7) and the truck frame members 10 and 12. The device R may be selectively positioned along the truck frame members 10 and 12 as the rear wheel assembly 14 is moved to a different position. The device R is disposed in front of the rear wheel assembly 14 relative to the direction of motion 16 of the truck. The rear wheel assembly may comprise one or two axles with each axle carrying four tires, as best shown in FIG. 1.

Figure 2:
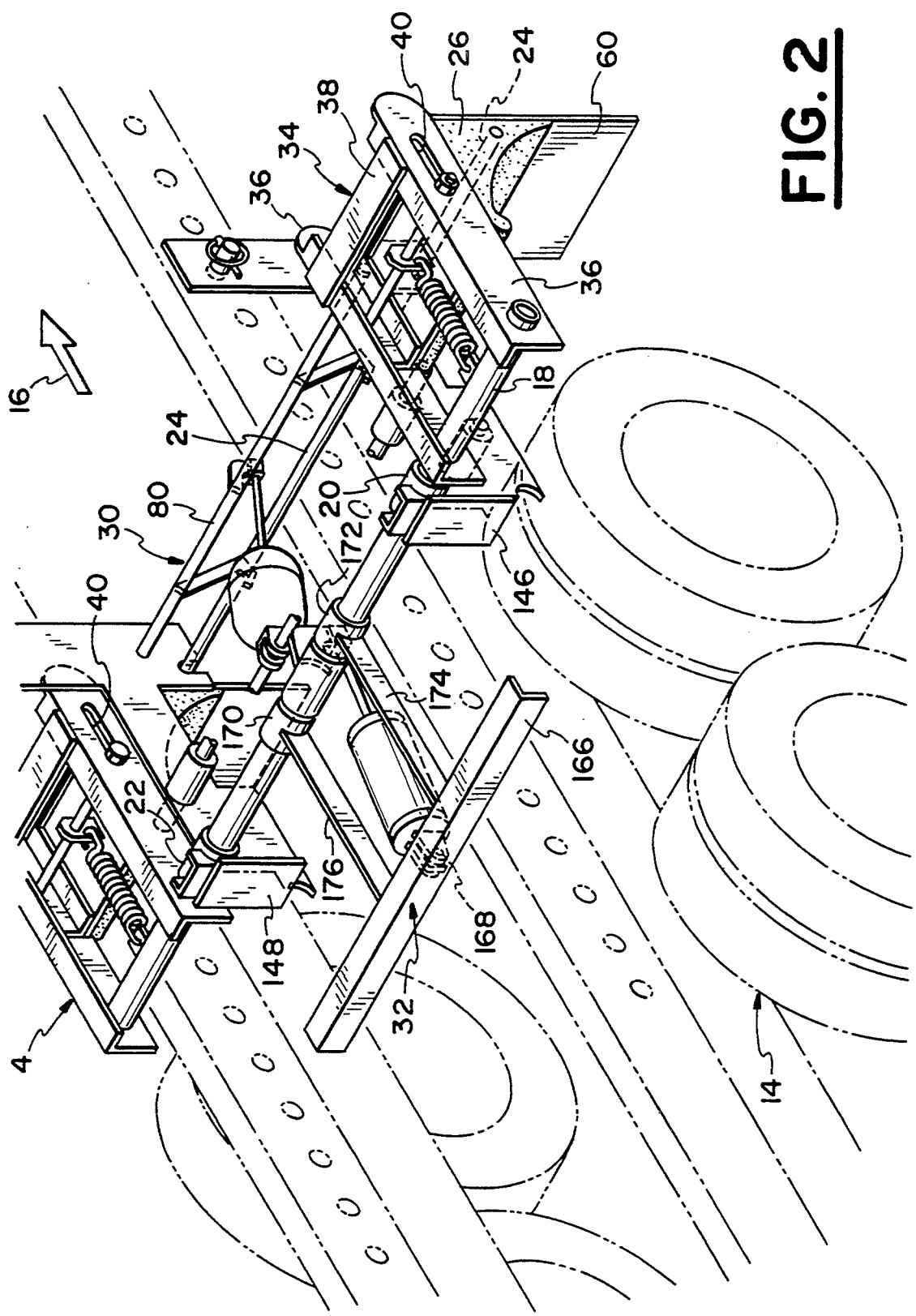
FIG. 2 is a perspective view of the brake device of FIG. 1, as shown in the raised or stored position.

The wedge assemblies 2 and 4 are rotatable about the fixed frames 6 and 8 by means of a pipe or rod member 18 rotatably supported by bearing sleeves 20 and 22 that are rigidly secured to respective one end of the frames 6 and 8, as best shown in FIGS. 1 and 2. The rod member 18 is rigidly secured to and rotates with the wedge assemblies 2 and 4 at its end portions. The end portions of a rod 24 are embedded in respective wedges 26 and 28 to advantageously permit the wedge assemblies 2 and 4 to drop down to their operative positions at the same time.

A latch mechanism 30 holds the wedge assemblies 2 and 4 in the raised or stored position when not in use and releases them so that they drop by gravity and simultaneously engage the respective rear wheels to stop the vehicle. A lifting mechanism 32 may be employed to raise the wedge assemblies 2 and 4 after use.

The wedge assemblies 2 and 4 are identical in construction and the following description is applicable to both. The wedge assembly 2 comprises a rotatable frame 34 that supports the wedge 26. The frame 34 includes a pair of spaced apart steel members 36 secured to a cross-member 38 at their bottom end portions and to the pipe member 18 at their upper end portions, as best shown in FIG. 2. The wedge 26 is disposed between the steel members 36 and is slidable along their longitudinal axis through respective slots 40 disposed on each member 36, as best shown in FIGS. 2 and 3. The members 36 are advantageously used standard angle irons to provide rigidity and strength. A pair of steel members 42 are disposed in sliding configuration relative to the respective members 36, as best shown in FIG. 4. A bearing plate 44 is interposed between the wedge 26 and the members 42, as best shown in FIGS. 3 and 4. A plurality of "T"-shaped bolts 46 molded into the wedge 26 secure the wedge 26 to the members 42 and the bearing plate 44. The members 42 are advantageously used angle irons with leg portions 48 and 50 for rigidity and strength, as best shown in FIG. 4. The leg portions 50 are secured to the bearing plate 44 by welding or other standard means. The leg portions 48 are rigidly secured to a bolt 52 whose end portions are slidingly secured to the respective slots 40. A bridge support 54 is rigidly secured to the bearing plate 44 by welding or other standard means substantially midway between the members 42 and is rigidly secured by welding or other standard means to an intermediate portion of the bolt 52, as best shown in FIG. 4.

A rectangular pipe or rod member 56 is rigidly secured to the bearing plate 44 and is received within a cooperating slot 58 disposed laterally within the wedge 26 to advantageously provide vertical support to the wedge 26 during operative use, as best shown in FIGS. 3 and 4.

A flap 60 is disposed underneath the wedge 26 and extends beyond the trailing portion of the wedge 26, as best shown in FIGS. 1 and 3. A plurality of bolts 62 rigidly secured to an end portion of the bearing plate 44 secure the leading edge portion 61 of the flap 60 through a spacer plate 64 and a bearing plate 66, as best shown in FIGS. 3 and 4. The flap 60 has the same width as the wedge 26. The flap 60 has ground contact surface 68 that includes a plurality of grooves 70 disposed in the direction of travel of the vehicle to advantageously divert water during use on a wet pavement, as best shown in FIG. 5. The flap 60 may be made of rubber or any other similar material. The flap 60 is advantageously long enough such that its trailing end portion 71 will be disposed directly underneath the wheels 14 during use to pull the wedge 26 tight against the rear wheel. The flap 60 will advantageously pull the wedge 26 horizontally at the trailing end portion 71 and downwardly at the leading end portion 61, producing a resultant force directed at an angle toward the interior of tire, thereby causing maximum contact between the tire and the wedge 26.

The flap 60 advantageously protects the wedge 26 from direct wear and tear and is relatively easily removable, without disassembly of the entire wedge assembly.

The wedge 26 is preferably made of molded hard polyurethane composition, such as BAYDUR 742, which is a polyurethane system available from Mobay Chemical Corporation, Pittsburgh, Pa. The polyurethane system used for the wedges 26 and 28 is particularly well suited because of its lightness, compressibility, durability, cure factors and other physical characteristics.

Figure 7:
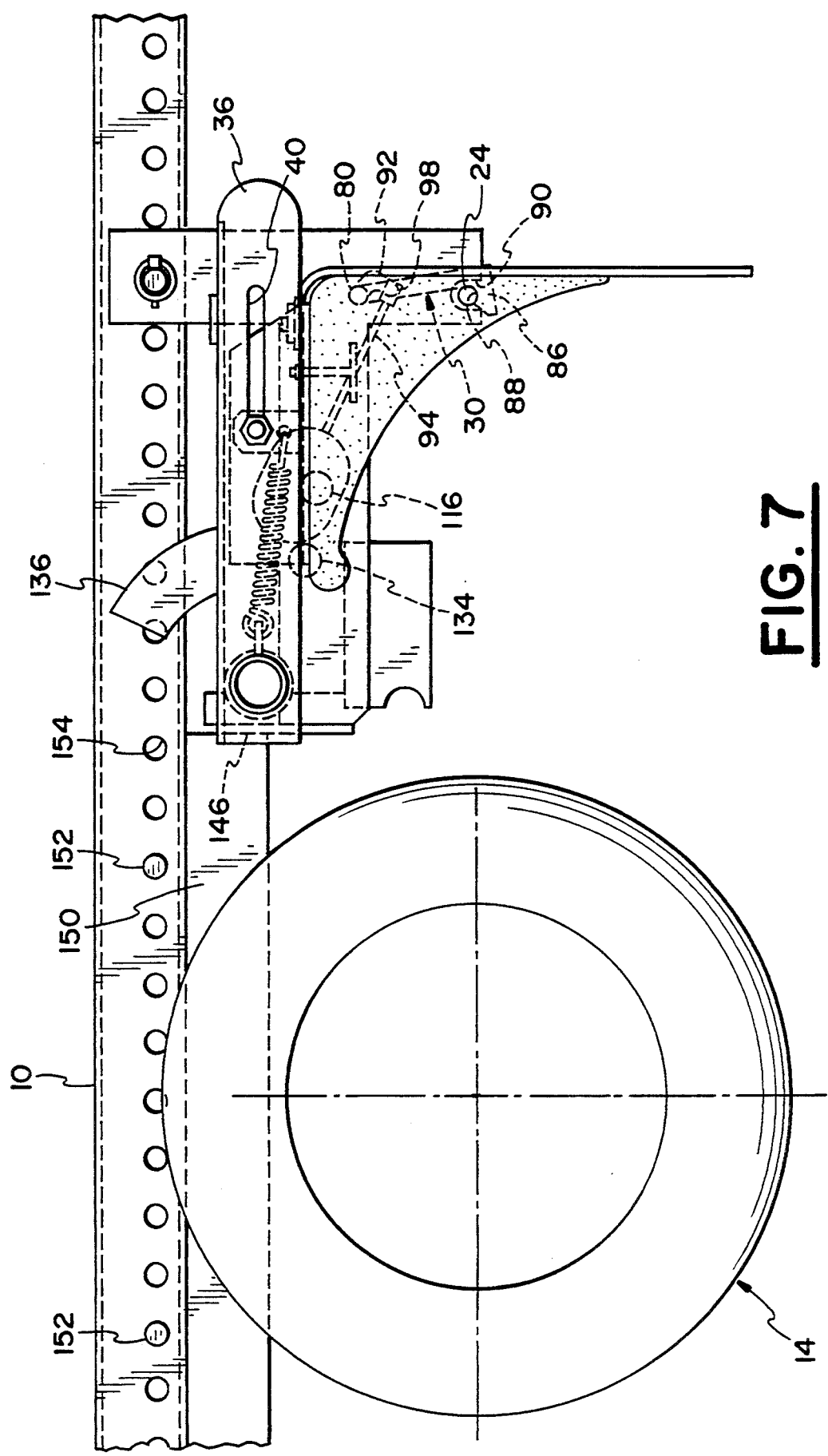
FIG. 7 is an enlarged side elevational view of FIG. 2.

The wedge 26 is substantially as high as the diameter and shorter than the diameter of wheels 14, as best shown in FIG. 7. The wedge 26 is as wide as the tandem wheels 14. The wedge 26 is substantially triangular in cross-section with a contact surface 72 that has substantially the same radius or curvature as the wheels 14, as best shown in FIG. 7. The wedge 26 has a projecting portion or bead 74 that extends across its entire width and is adapted to make contact with the wheels 14 substantially at a distance above the ground to about a point 81 equal to the radius of the tires 14. The bead 74 projects above an adjacent portion 75 of the arcuate surface 72, as best shown in FIG. 3. The wedge 26 has trailing end portion 76 that is adapted to be disposed slightly in front of the vertical centerline 73 of the wheels 14, such that the trailing end portion 71 of the flap 60 is interposed directly underneath the tires 14 during use, below the centerline 73. The wedge 26 in cross-section is substantially triangular in shape with vertical planar surface 77 and horizontal planar surface 79, as best shown in FIG. 3. It is not necessary that the curvature of the contact surface 72 be exactly identical to the curvature of the wheels 14, provided that the projecting portion or bead 74 essentially makes contact with the wheel first before substantially making contact with the rest of the surface 72.

A spring 78 secured between the pipe member 18 and the bridge support 54 urges the wedge 26 toward the pipe member 18 and advantageously helps in distributing the force exerted by the flap 60, as best shown in FIGS. 2 and 8. The spring 78 also advantageously assists in lifting the wedge assembly 26 to its stored, nonoperative position after use, as will be further described.

The latch mechanism 30 comprises a rod 80 rotatably secured at its end portions by the frames 6 and 8, as best shown in FIG. 1. A pair of latching arms 82 are secured in parallel configuration at their respective upper end portions 84 to the rod 80, best shown in FIGS. 1, 2, 6 and 7.

Figure 6:
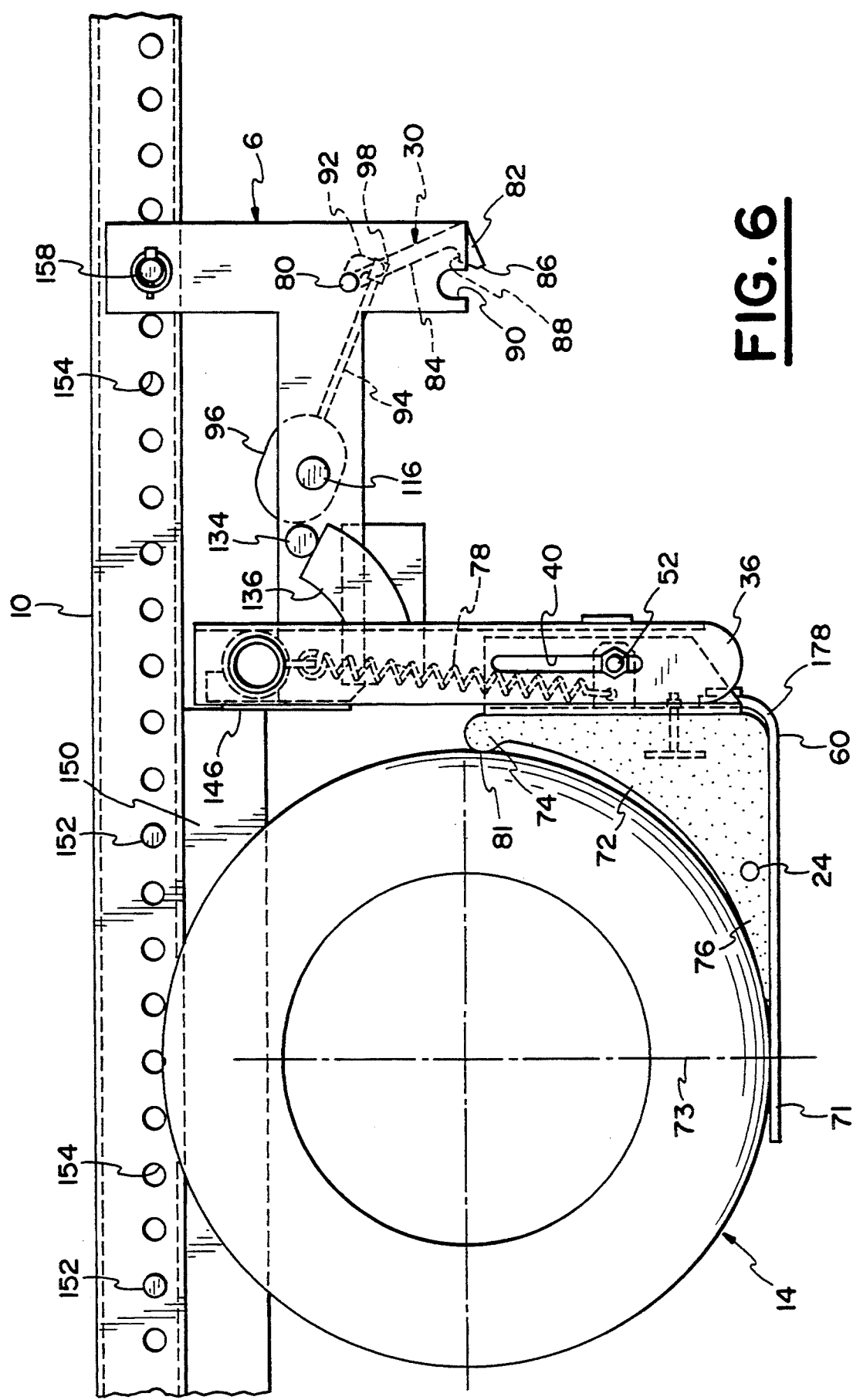
FIG. 6 is an enlarged side elevational view of FIG. 1.

The arms 82 have lower end portions 86, each of which has a hook 88 adapted to receive and support the rod 24 when the wedge assemblies are in the raised or stored position, as best shown in FIG. 6. A downwardly disposed slot 90 in a lower end portion of each frames 6 and 8 cooperate with the hooks 88 to thereby secure the rod 24 and prevent it from accidentally dropping off from the arms 82. A lever arm 92 has one of its end rigidly secured to the rod 80 and its other end pivotally secured to an actuating arm 94 of a pneumatic actuator, such as a piston and cylinder assembly 96, as best shown in FIGS. 7 and 8. Pivot connector 98 securing the actuating rod 94 and the lever arm 92 permits rotation of the rod 80 when the actuating arm 94 is extended to release the wedge assemblies 2 and 4, as best shown in FIG. 6. The actuator 96 is suitably supported by a pivoting support 99 to permit rotational movement during extension and retraction of the actuating arm 94. The actuator 96 is normally energized with air pressure or the like when in the holding position, as best shown in FIGS. 2 and 7. Relieving the air pressure will cause the actuating arm 94 to extend and release the wedge assemblies 2 and 4.

An electric solenoid (not shown) may also be used for the actuator 96, with the advantage of being independent from the hydraulic or pneumatic system of the vehicle. The electric solenoid may be powered from the electrical system of the truck, providing reliable actuation of the emergency brake device R even in the event of total failure of the hydraulic or pneumatic circuit of the vehicle.

Controls (not shown) for actuation of the actuator 96 is advantageously disposed within the cab of the vehicle to enable the driver to deploy the emergency brake device R at any time.

A locking mechanism 100 to hold the wedges 2 and 4 in the engaged or operative positions and prevent them from bouncing forward is disclosed in FIGS. 8(a) and 8(b). A bolt 102 with a square head 104 is secured diametrically through the pipe member 18 at two locations, preferably adjacent the respective bearing sleeves 20 and 22. A plate 106 is rigidly secured to a pivotable rod 107 at one end and biased by spring secured to a stationary support 111 such that the other end 110 is biased towards the pipe member 18, as best shown in FIG. 8(a). When the wedge assemblies 2 and 4 are released from their raised or stored position, the rotatable frames 34 drop by gravity toward the wheels 14. The pipe member 18 rotates with the frame 34, since they are rigidly secured together. As the pipe member 18 rotates, the square head 104 forces the end portion 110 outwardly. As the frame 34 continues to rotate in the clockwise direction 112, the head 104 goes past the end portion 110, at which time the end portion 110 snaps back towards the pipe member 18, thereby locking the frame 34 against rotation in the counterclockwise direction, as best shown in phantom lines in FIG. 8(b). A pushhandle 113 pivotally connected to a crank arm 115 and actuated in the direction of the arrow 117 provides means for releasing the plate 106 from the bolt head 104, as best shown in FIG. 8(b). The bolt head 104 acts as a stop in cooperation with the end 110 of the plate 106.

An alternative embodiment for a latch mechanism 114 is disclosed in FIG. 9. The latch mechanism 114 comprises a pair of pins 116 slidably received within bearing sleeves 118 supported by frames 6 and 8. The pins 116 are actuated by a linkage mechanism 120 comprising a plurality of pivotally connected linkage arms 122, 124 and 126. A stationary support 128 is pivotally connected to an intermediate portion of the linkage arm 124, as best shown in FIG. 9. A spring 130 connected between the frame 6 and one end of the linkage arm 124 biases the pins 116 in their extended positions to thereby support the members 36 of the respective wedge assemblies 2 and 4. An actuator 132, such as a pneumatic piston and cylinder assembly or an airbrake actuator, when actuated causes the pins 116 to move inwardly, thereby permitting the frames 36 to drop downwardly by gravity.

The wedge assemblies 2 and 4 may also be locked down in place after deployment by a pair of pins 134 that are actuated in similar fashion as illustrated for the latching mechanism 114. The pins 134 are flush with the frames 6 and 8 and under compression against the adjacent sides of the frames 36. When the wedge assemblies 2 and 4 are released from their raised or stored positions, the respective frames 36 and an extension plate 136 will slide against the pins, keeping the pins 134 depressed. As soon as the pins 134 clear the ends of the extension plates 136, the pins 134 will pop out due to the biasing force of the spring 130, thereby locking the wedge assemblies 2 and 4 in the down position, as best shown in FIG. 6.

Figure 10:
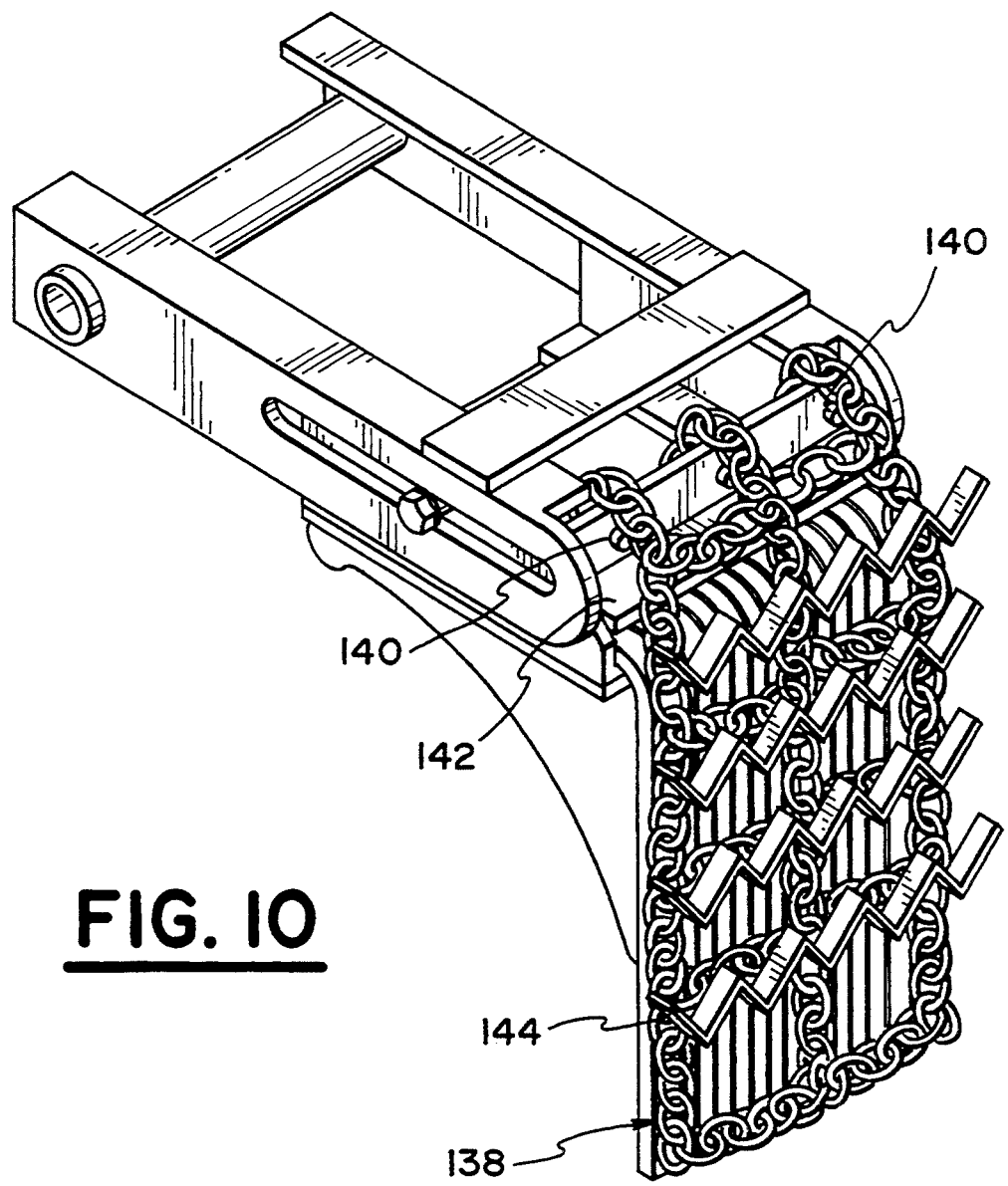
FIG. 10 is a perspective view of a wedge assembly used in the present invention, shown in the raised or stored position with a removable chain mat.

The wedge assemblies 2 and 4 may be equipped with a removable chain mat 138, as best shown in FIG. 10. The chain mat is removably secured with a plurality of bolts 140 secured to angle steel member 142. The chain mat 138 may be equipped with gripping members 144 that are welded to the chain links of the chain mat 138, as best shown in FIG. 10. The gripping members 144 are advantageously saw-tooth shaped in plan view to promote a digging action into snow or glare ice.

A pair of mounting brackets 146 and 148 are rigidly secured to the respective bearing sleeves 20 and 22, as best shown in FIGS. 1 and 2. The mounting brackets 146 and 148 are rigidly secured to respective spring hangers (not shown) of the wheel axle assembly 150, shown schematically in FIG. 6. The wheel axle assembly 150 are selectively positionable along the truck frame members 10 and 12 by means of removable pins 152 that are received in a pair of respective holes 154 in the frame members 10 and 12 and in the wheel axle assembly 150. The other ends of the frames 6 and 8 are removably secured to the respective truck frame members 10 and 12 by means of cooperating holes 154 and 156 receiving removable pins 158, as best shown in FIGS. 6 and 7. Thus, when the position of the wheel assembly 14 is adjusted along the truck frame members 10 and 12 to better support the weight of the freight being hauled, the emergency brake device R advantageously moves with it.

By securing the device R to the wheel axle assembly, braking forces generated during the braking action are advantageously transmitted to the wheel axle assembly, which is designed to withstand tremendous forces without damage. During braking action, the forces tending to pull the wedge assembly 2 downwardly are transmitted to the wheel axle which then tend to push the wheels downwardly to the ground, thereby generating increased frictional forces compared to vehicles using regular brakes.

The power lifting mechanism 32 may be used in lieu of manually lifting the wedge assemblies 2 and 4 after use. The lifting mechanism 32 comprises a lever arm 160 that is rigidly secured to the tube member 18, as best shown in FIG. 1. An actuator 162, such as pneumatic cylinder and piston assembly, is pivotally connected to the lever arm 160 with pivot connector 164, as best shown in FIG. 1. Actuation of the actuator 162 will cause the rotation of the pipe member 18 in a counterclockwise direction to thereby lift the wedge assemblies 2 and 4, as best shown in FIGS. 1 and 2. The actuator 162 is supported by a bracket 166 by means of a pivot connector 168, as best shown in FIGS. 1 and 2. Additional bearing sleeves 170 and 172 rotatably support the intermediate portion of the pipe member 18 through a pair of brackets 174 and 176, as best shown in FIGS. 1 and 2.

In operation, the wedge assemblies 2 and 4 are stored in their raised or stored positions by means of the latch mechanism 30. When an emergency arises, requiring the use of the emergency brake device R, the operator deactivates the actuator 96 by releasing the air pressure within its chamber, causing the rod 80 and the connected latching arms 82 to rotate counterclockwise, thereby releasing the rod 24 and causing the wedge assemblies 2 and 4 to immediately drop downwardly due to gravity. The trailing end 71 of the flaps 60 are then caught underneath the wheels 14, thereby pulling the respective wedges 26 against the wheels. The projections 74 of the wedges 26, being located at about half the height of the tires, would tend to absorb squarely the forces of impact with the tires, generating reaction forces that are substantially horizontally disposed, thereby minimizing any upwardly directed forces that would tend to lift the tires and thereby decrease the downward forces responsible for generating friction forces. In addition, the location of the projections 74, being relatively closer to the rotatable bearing sleeves 20 and 22 acting as fulcrum, advantageously make for a relatively shorter lever arm with respect to the fulcrum, thereby generating smaller torques that would tend to push the wedge assemblies 2 and 4 away from the tires.

Friction forces are generated in the general vicinity indicated at 178, which is advantageously half a tire closer to the center of gravity of the vehicle. The center of gravity is located at some point between the front and rear wheels of the truck. A person of ordinary skill in the art will understand that the portion of the truck weight being supported by the rear wheels will increase if the frictional point of contact with the ground is moved closer to the center of gravity of the truck. Thus, during use of the device R, the point of contact with ground is shifted from the tires to the wedge assemblies 2 and 4 generally at the point 178 closer to the center of gravity of the truck, thereby increasing the normal (vertical) forces at that point and increasing the frictional forces available, which are dependent on the normal forces.

Because the wedges 26 and 28 are made of a resilient material, the projections 74 will deform, thereby absorbing the impact forces with the tire and providing a relatively gradual deformation of the wedges 26 and 28 as their contact surfaces 72 eventually engage the tires. In the process, normal forces are shifted toward the area 178, where most of the wear occurs.

The forward ends 61 of the flaps 60 being secured at the vertical planes of the wedges 26 and the trailing ends being caught underneath the tires pull the wedges downwardly and horizontally into the tires, promoting effective contact between the wedges and the tires. The pipe members 56 secured to the bearing plate 44 and embedded across the wedge 26 provide vertical support for the wedges 26 as they are pulled down by the action of the flaps 60.

After the vehicle has come to a stop, the driver backs up the vehicle a short distance, causing the spring 78 to pull the flaps 60 clear of the tires. The wedge assemblies 2 and 4 could then be lifted manually. If the lifting mechanism 32 is used, then actuating the actuator 162 causes the pipe member 18 to be rotated counterclockwise, carrying with it the wedge assemblies 2 and 4, as best shown in FIG. 2.

The wedge assemblies 2 and 4 are locked in their down or operative positions by the locking mechanism 100 or the pins 134, thereby preventing the wedge assemblies from repeatedly bouncing upwardly and making effective contact between the wheels and wedges 26 and 28. During the braking operation, the stress developed is advantageously transmitted through the wheels and axle assembly which are the strongest parts of the vehicle.

The actuator 96 is in the latched position, as best shown in FIG. 2, when there is air pressure in the system. When the air pressure falls below a desired minimum level, the actuating arm 94 will automatically extend, thereby releasing the wedge assemblies 2 and 4. The driver will then be unable to operate the vehicle until the air pressure problem is fixed. If the vehicle happens to be moving when the air pressure falls below a desired minimum level, the emergency brake device R will therefore automatically deploy. As discussed in the foregoing, an electric solenoid or another actuator powered from an independent source may be used.

Since the wedges 26 and 28 are connected together by the rod 24, they both fall at the same time and engage the rear wheels at the same time, thereby allowing controlled, straight and even stopping. Also, since the emergency brake device R provides substantially greater stopping forces at the rear wheels, the tendency of a trailer to jack-knife during an emergency stop is avoided. Emergency stops are straight. The driver is able to stay in one lane of traffic and stop in an extremely short distance. Because the emergency brake device R acts against both rear wheels at the same time, it can be applied while the vehicle is going around a turn or otherwise engaged in maneuvers. Stopping distances using the present invention have been found to be about one-half the normal braking distances for heavy trucks.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency brake device for stopping the rear wheels of a vehicle, comprising:
   a) a wedge assembly including a resilient solid wedge, said wedge assembly for operably securing to an underside of the vehicle ahead of a rear wheel, said wedge being adapted to deform to absorb impact forces when engaging with the wheel and the ground during use;
   b) said wedge assembly being movable from a stored position to an operative position such that said wedge is disposed between the rear wheel and the ground thereby to stop the vehicle;
   c) said wedge having an arcuate surface for engaging against the wheel when said wedge assembly is in said operative position, said arcuate surface being adapted to deform to the shape of the wheel for maximum contact; and d) said arcuate surface including a longitudinal beaded projection extending across the width of said wedge at an upper end portion of said wedge such that said projection engages the wheel when said wedge assembly is in said operative position.

2. An emergency brake device as in claim 1, wherein:
a) said wedge assembly includes a flap secured to said wedge such that when said wedge assembly is in said operative position, said flap is disposed between a horizontal surface of said wedge and the ground;
b) said flap includes a trailing end portion extending beyond an end portion of said wedge adapted to be disposed underneath the wheel thereby to pull said wedge horizontally; and
c) said flap includes a leading end portion secured to a vertical surface of said wedge thereby to pull said wedge downwardly.

3. An emergency brake device as in claim 2, wherein:
a) said flap includes a plurality of grooves disposed along the direction of travel of the vehicle.

4. An emergency brake device as in claim 2, wherein:
a) said wedge assembly includes a bearing plate secured to said wedge vertical surface;
b) a box member secured to said bearing plate and disposed across the width of said wedge; and
c) said box member is disposed within a complementary slot in said wedge.

5. An emergency brake device as in claim 4, wherein:
a) said wedge assembly includes a plurality of "T"-shaped bolts for securing said wedge to said bearing plate.

6. An emergency brake device as in claim 5, wherein:
a) said flap includes a leading edge portion;
b) said wedge assembly includes a bar plate; and
c) said flap leading edge portion is compressed between said bearing plate and said bar plate.

7. An emergency brake device as in claim 2, and further comprising:
a) a chain mat removably secured to said wedge assembly such that said chain mat is interposed between said flap and the ground when said wedge assembly is in said operative position.

8. An emergency brake device as in claim 7, and further comprising:
a) gripping members secured across the width of said chain mat, each of which is saw-toothed shaped in plan view.

9. An emergency brake device as in claim 1, and further comprising:
a) a support adapted for securing to an underside of the vehicle ahead of a rear wheel;
b) said wedge assembly including a frame operably secured to said support; and
c) said support is removably secured to the vehicle.

10. An emergency brake device as in claim 9, wherein:
a) said support includes a rear end for securing to a wheel axle assembly of the rear wheel and a front end removably secured to a frame of the vehicle.

11. An emergency brake device as in claim 10, wherein:
a) said wedge assembly frame of said wedge assembly includes a first end portion rotatably secured to said support rear end and a second end portion secured to said wedge.

12. An emergency brake device as in claim 5, wherein:

a) said second end portion includes a slot; and
b) said wedge is slidably secured to said slot.

13. An emergency brake device as in claim 11, wherein:
a) said wedge assembly includes a spring for biasing said wedge upwardly toward said first end portion.

14. An emergency brake device as in claim 1, wherein:
a) said wedge is polyurethane.

15. An emergency brake device as in claim 1, wherein:
a) said arcuate surface is substantially complementary to the shape of the wheel.

16. An emergency brake device as in claim 1, wherein:
a) said projection is disposed at a distance above the ground at least equal to the radius of the wheel when said wedge assembly is in said operative position.

17. An emergency brake device as in claim 1, and further comprising:
a) a latch assembly for holding said wedge assembly in said stored position.

18. An emergency brake device as in claim 17, wherein:
a) said latch assembly includes an arm selectively positionable between a latching position adapted to support said wedge assembly in said stored position and a release position adapted to permit said wedge assembly to drop to said operative position.

19. An emergency brake device as in claim 18, and further:
a) a support adapted for securing to an underside of the vehicle ahead of a rear wheel;
b) said support including a first slot directed downwardly;
c) said wedge assembly including a rod adapted to be received within said first slot when said wedge assembly is in said stored position; and
d) said arm including a second slot disposed upwardly adapted to receive said rod when said wedge assembly is in said stored position such that said rod is positively locked in place.

20. An emergency brake device as in claim 18, wherein:
a) said latch assembly includes an actuator operably connected to arm; and
b) said actuator is energized when said arm is in said latching position and de-energized when said arm is in said release position.

21. An emergency brake device as in claim 17, wherein:
a) said latch assembly includes a retractable pin.

22. An emergency brake device as in claim 1, and further comprising:
a) an actuator operably connected to said wedge assembly for lifting said wedge assembly to said stored position after being deployed.

23. An emergency brake device as in claim 1, and further comprising:
a) a lock mechanism for holding said wedge assembly in said operative position after being deployed.

24. An emergency brake device as in claim 23, wherein:
a) said lock mechanism includes a stop operably secured to said wedge assembly and a plate for operably securing to a frame of the vehicle; and b) said plate includes an edge that locks against said stop after said wedge assembly is in said operative position.

25. An emergency brake device as in claim 23, wherein:
   a) said lock mechanism includes a retractable pin.

26. An emergency brake device for stopping the rear wheels of a vehicle, comprising:
   a) a wedge assembly including a resilient solid wedge, said wedge assembly for securing to an underside of the vehicle ahead of a rear wheel, said wedge being adapted to deform to absorb impact forces when engaging with the wheel and the ground during use;
   b) said wedge assembly being movable from a stored position to an operative position such that said wedge is disposed between the rear wheel and the ground thereby to stop the vehicle;
   c) said wedge assembly including a flap operably secured to said wedge such that when said wedge assembly is in said operative position, said flap is disposed between said wedge and the ground;:
   d) said wedge having an arcuate surface for engaging against the wheel when said wedge assembly is in said operative position, said arcuate surface being adapted to deform to the shape of the wheel for maximum contact; and
   e) said arcuate surface including a longitudinal beaded projection extending across the width of said wedge at an upper end portion of said wedge such that said projection engages the wheel when said wedge assembly is in said operative position.

27. An emergency brake device as in claim 26, wherein:
   a) said flap includes a trailing end portion extending beyond an end portion of said wedge, said flap is adapted to be disposed underneath the wheel thereby to pull said wedge horizontally;
   b) said wedge includes a vertical front portion when said wedge is in said operative position; and
   c) said flap includes a leading end portion secured to said vertical front portion of said wedge thereby to pull said wedge downwardly.

* * * * *